United States Patent [19]

Baran

[11] Patent Number: 5,406,269

[45] Date of Patent: Apr. 11, 1995

[54] METHOD AND APPARATUS FOR THE REMOTE VERIFICATION OF THE OPERATION OF ELECTRONIC DEVICES BY STANDARD TRANSMISSION MEDIUMS

[75] Inventor: David Baran, 83 James Ave., Atherton, Calif. 94025

[73] Assignee: David Baran, Atherton, Calif.

[21] Appl. No.: 106,315

[22] Filed: Aug. 13, 1993

Related U.S. Application Data

[63] Continuation of Ser. No. 726,028, Jul. 5, 1991, abandoned.

[51] Int. Cl.$^6$ .............................................. H04Q 9/02
[52] U.S. Cl. ........................ 340/825.17; 340/825.06; 340/825.15; 340/825.16; 340/531; 379/40
[58] Field of Search ................ 340/825.17, 825.06, 340/825.14, 825, 15, 825.16, 870.02, 531, 534, 825.52, 825.49; 379/40, 142

[56] References Cited

U.S. PATENT DOCUMENTS

| | | | |
|---|---|---|---|
| 4,361,832 | 11/1982 | Cole | 340/825.06 |
| 4,703,324 | 10/1987 | White | 340/825.14 |
| 4,712,097 | 12/1987 | Hashimoto | 379/40 |
| 4,718,005 | 1/1988 | Feigenbaum | 340/825.52 |
| 4,754,262 | 6/1988 | Hackett | 340/825.14 |
| 4,914,689 | 4/1990 | Quade | 379/142 |
| 4,926,162 | 5/1990 | Pickell | 340/531 |
| 4,940,976 | 7/1990 | Gastouniotis | 340/870.02 |

Primary Examiner—Donald J. Yusko
Assistant Examiner—Brian Zimmerman
Attorney, Agent, or Firm—Allston L. Jones

[57] ABSTRACT

Hardware or software is added to a local system that has incorporated therewith a modem that is normally connected to the switched telephone system to initiate surreptitious calls to report various data to a remote monitoring station. These reporting calls are made from the remote equipment to one or more monitoring sites. The call initiation is preferentially triggered at a carefully controlled semi-random rate, perhaps once a week. The exact time chosen is concealed from the operator of the system that is reporting to the monitoring site. The same modem, or modems, normally used by the local system being monitored is (are) also used for an outgoing data call to ensure that the telephone connection is always accessible to the monitoring apparatus. For voice mail systems which lack modems, DTMF (Touchtone) can be used to transfer data. Toll free numbers such as "800" telephone numbers in the United States and Canada are used to eliminate operating costs to the owner of the local system that is being monitored.

38 Claims, 5 Drawing Sheets

METHOD AND APPARATUS FOR THE REMOTE VERIFICATION OF THE OPERATION OF ELECTRONIC DEVICES BY STANDARD TRANSMISSION MEDIUMS

This is a continuation of application of Ser. No. 07/726,028, filed on Jul. 5, 1991, now abandoned.

FIELD OF THE INVENTION

This invention relates to remote monitoring of electronic systems and the prevention of misuse of proprietary software. Namely a system that includes a telephone interface subsystem that is preprogrammed to periodically call a monitoring station and report its current status.

BACKGROUND OF THE INVENTION

The prior art includes systems wherein a central site, using a computer with a modem, polls systems at remote sites having local modems for status information. Similarly, the prior art also includes appliances that contain a preprogrammed modem and microprocessor to call a central service center when malfunctions occur in the appliance.

On-line service system providers have a difficult time monitoring exactly what happens to a system after it leaves the factory. It would be desirable to have a device that attaches to a system that performs several functions:

Performance Monitoring: For example, fax and voice service systems are relatively complex, and it is difficult for the customer to properly monitor all of the functions of the system. It would be helpful to be able to detect configuration errors (wrong phone number programmed into the system) as well as monitoring the performance of units once they are installed so that the supplier can recommend configuration changes to the customer. This information could also be used for sales purposes, e.g. to determine those customers who are ready for system capacity upgrades.

Fault detection and isolation: System design efforts seek to create "set it and forget it" systems. Ideally, once installed in a phone closet, the customer need never worry about the actual working of the system. This poses a problem: if one non-critical component fails the customer will probably not notice it. For example, if a fax board in a fax server stops working, the unit will probably continue to function normally, although at a reduced capacity. Problems of this nature generally go undetected for several months until the customer becomes increasingly annoyed at the declining performance of the system. What is needed is a way to detect this type of problem early so that remedial action can be taken before the problem has been noticed.

Marketing Information: Sale of voice and fax servers, and similar equipment, is based upon an economic argument in their sales effort—it is cheaper to buy an automated unit than to hire a person to do the faxing. There is the need for hard numbers to quantify exactly how much traffic the systems in the field are experiencing. For example, it would be extremely useful to be able to show a prospective customer a report listing the number of pages each day that are sent by systems that are already installed.

Royalty Avoidance Protection: It is unfortunate, however, vendors of PC-based voice mail systems have discovered that not all of their dealers are honest. Some "fly-by-night" dealers purchase one or two systems from the vendor and make copies of the software disks. They then go direct to other manufactures and purchase voice boards. Combined with the copied software, the vendor then churns out completed voice mail systems without paying any royalty to the voice mail software company. In applications of this nature, support is always provided by the local dealer. With the software company removed from the support loop, illegal copying is difficult to detect. Some software vendors have been forced to resort to bundling the software to hardware devices which are usually attached to the parallel port of a system. In such configurations, if the software doesn't see this "lock" device, namely the board bundled with it, the software refuses to operate. The problem here is that the hardware device is obviously a theft protection device, and it tells the customer, "We don't trust you". The insult implicit with the use of such highly visible devices is not conducive to sales.

The software sales path is presently a one-way process in which knowledge (software) moves from the developer to the end-user. What is needed is a user transparent device which can serve as a conduit for information in the other direction; i.e. from the end-user's system back to the developer/manufacturer, without creating a nuisance to the user.

What is missing in the prior art is a local system that includes some or all of the following features:
1) a call-out feature of the local unit that is concealed from the local system user;
2) the use of modems and telephone lines for software copy protection;
3) the use of random periodicity of the calling-out function to prevent its anticipation by the local system user;
4) the use of calling periodicity to allow detection of multiple units using copies of software intended for use in a single unit only;
5) the use of toll free numbers to avoid detection by means of unrecognized toll charges on the local system user's telephone bill; and
6) the use of ANI (automatic number identification) to uniquely determine the identity of the local calling site.

SUMMARY OF THE INVENTION

In accordance with the preferred embodiments of the present invention, hardware or software is added to a local system that has incorporated therewith a modem that is normally connected to the switched telephone system that initiates surreptitious calls to report various data to a remote monitoring station. These reporting calls are made from the remote equipment to one or more monitoring sites. The call initiation is preferentially triggered at a carefully controlled semi-random rate, perhaps once a week. The exact time chosen is concealed from the operator of the system that is reporting to the monitoring site. The same modem, or modems, normally used by the local system being monitored is (are) also used for an outgoing data call to ensure that the telephone connection is always accessible to the monitoring apparatus. For voice mail systems which lack modems, DTMF (Touchtone) can be used to transfer data. Toll free numbers such as "800" telephone numbers in the United States and Canada are used to eliminate operating costs to the owner of the local system that is being monitored.

BRIEF DESCRIPTION OF THE FIGURES

This invention can be better understood by reference to the included figures which are briefly described below.

DETAILED DESCRIPTION OF THE PREFERRED EMBODIMENT

Figure 1:
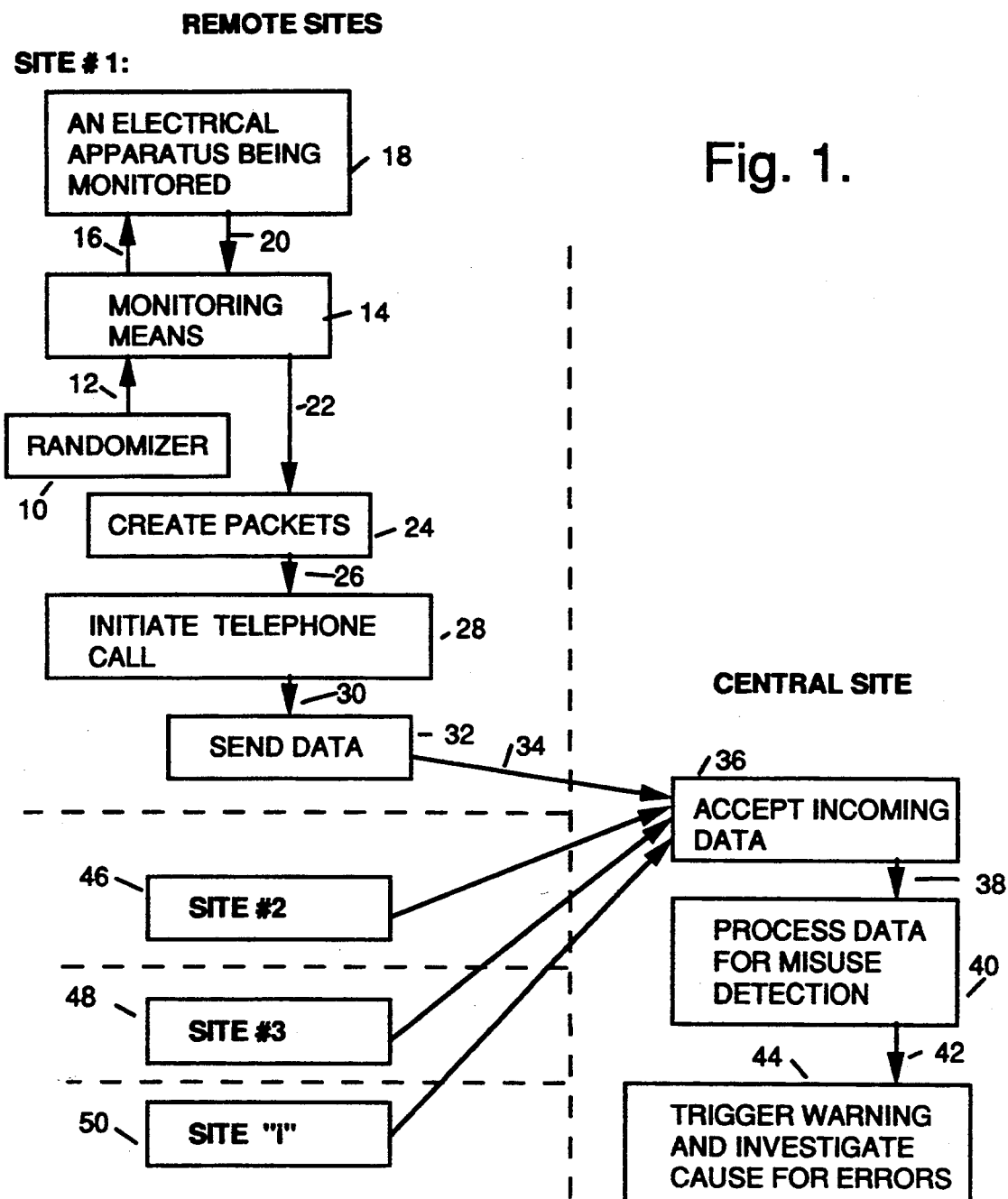
FIG. 1 is a flow chart of the major functions performed by the present invention.

Referring first to the flow chart of FIG. 1 there is shown on the left side of the figure Remote Sites 1-i, and on the right side of the figure the Central Site. Each of the Remote Sites includes an electrical apparatus 18 that is to be monitored. Apparatus 18 can be any type of apparatus that one wishes to monitor, e.g. a voice mail system, a fax machine, or any computer on which selected software that is to be monitored is installed. In order for the present invention to perform the desired monitoring function, apparatus 18 must include or be connected to a means for communicating via telephone lines, such as a modem, a fax machine or DTMF encoder. The Central Site, which is discussed more completely below, is disposed to monitor the apparatus 18 at each of the "i" sites by means of an input device that is compatible with the device used by apparatus 18 to communicate over a telephone line.

The monitoring system of the present invention is intended to be secretly included at the time of sale in the apparatus 18 that is then installed at the user's Remote Site. The system of the present invention includes a randomizer 10 which determines when the status of the apparatus 18 is to be reported to the Central Site by generating a wake-up signal 12 to activate the monitoring means 14. Monitoring means 14 then generates an interrogation signal 16 that is applied to apparatus 18. In response, apparatus 18 generates a status signal 20 back to monitoring means 14, with signal 20 including information that apparatus 18 was preprogrammed to provide. That information would include, for example, the serial number of apparatus 18 or the software that it is running, how many out-going calls per hour are made on each of the available channels, from what telephone number the call was made, and any other information that would be useful in detecting operational problems with apparatus 18 or maintaining the quality of performance of apparatus 18 to the user. Next, monitoring means 14 generates an output signal 22 to logical unit 24 which organizes the information of signal 22 into a packet for transmission to the Central Site by modem, fax, DTMF generator, or other transmission means. Each packet contains all relevant data (information that the apparatus was preprogrammed to provide) within a single logical envelope including the telephone number to be called and the serial number of the apparatus being monitored. A telephone call is then initiated (block 28) to the Central Site with the outgoing packet 26 being converted by a modem, fax or DTMF generator in the send data unit 32 and sent to the Central Site as a conventional telephone signal 34.

The packetization of the data in block 24 can be performed by several techniques that are well known in the art. For example, with FAX modems the HDLC frame structure as defined in CCITT T.30 is generally preferred. There are similar standards or quasi-standards for modems and DTMF equipped systems.

The Central Site receives data encoded telephone signals 34 from a number of Remote Sites 46, 48 and 50, as well, as from Site 1. The telephone signals are decoded at the accept incoming data block 36 by a unit that is compatible to that used in send data block 32, with the decoded signals 38 being applied to the processing block 40. At block 40 data 38 is examined for indications of nonstandard performance, such as performance that is not in accordance with the manufacture's specifications or with the license agreement. If a nonstandard performance signal is received, a warning signal 42 is generated and applied to block 44 where a request for manual or automatic investigation is flagged.

Figure 2:
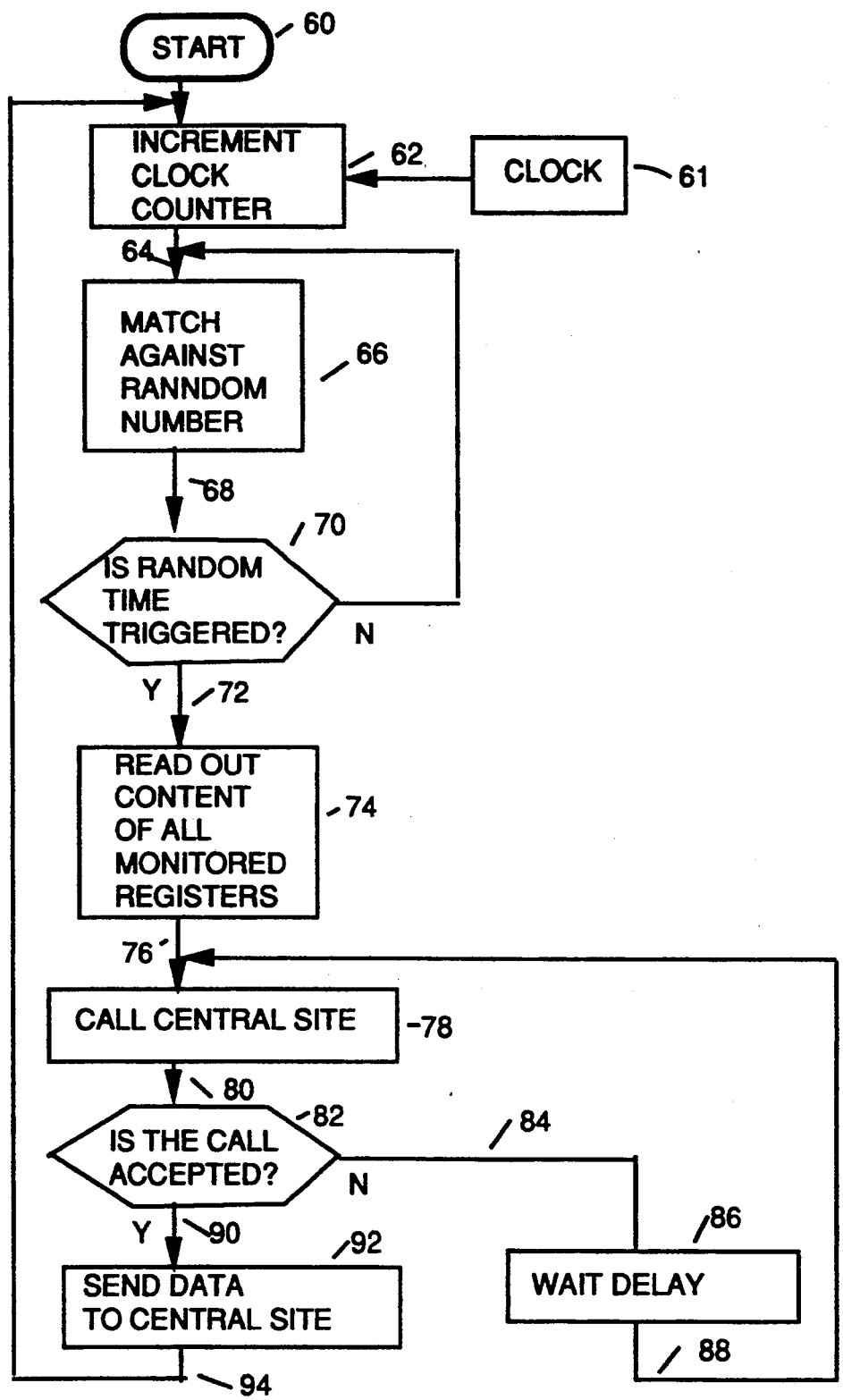
FIG. 2 is a detailed flow chart of the randomizer portion of the flow chart of FIG. 1.

FIG. 2 is a flow chart that is provided to illustrate the operation of the randomizer block 10 in cooperation with selected functions of the other blocks of FIG. 1. Randomizer 10 performs two different functions. The first is that of a clock to insure that one call per time period, such as day/week/month, is made to the Central Site. Second, that call is made randomly at only one time during that period. The present invention is designed to make one, and only one, call during the selected period to enable processor 40 to detect situations where more than one system is using the same copy of the software. If more than one system 18 is using software with the same serial number there will be more than one interrogation occurring during that time period.

Randomizer 10 includes an independent clock 61 to provide basic timing. Each clock pulse increments counter 62 to produce an output signal 64 for comparison against a random number produced by block 66. The random number is chosen from a range of numbers that corresponds to the total number of clock time units necessary to cause one output per the selected time period, e.g. day/week/month. Thus the triggering time is uniformly randomly distributed over the selected time interval, say one month. If the clock increment and the random number match, signal 72 is generated at decision block 70, otherwise control is returned to block 66. Signal 72 (signal 12 in FIG. 1) initiates the readout of all the monitored registers 74 and a signal is generated to call the Central Site (block 78). The Central Site (block 82) either accepts the call (block 90) or not (block 84), depending upon whether the line is busy, etc. If the call is not accepted, a wait delay is introduced by block 86 and the delayed signal 88 loops back to block 78 to try calling again. This process is repeated until the call is completed. If there is no response, the delay 86 can be increased each time through the loop and the system retried. If the call is accepted by the Central Site (block 92), the data (signal 34 in FIG. 1) is sent to the Central Site, then control is returned to block 62.

Figure 3:
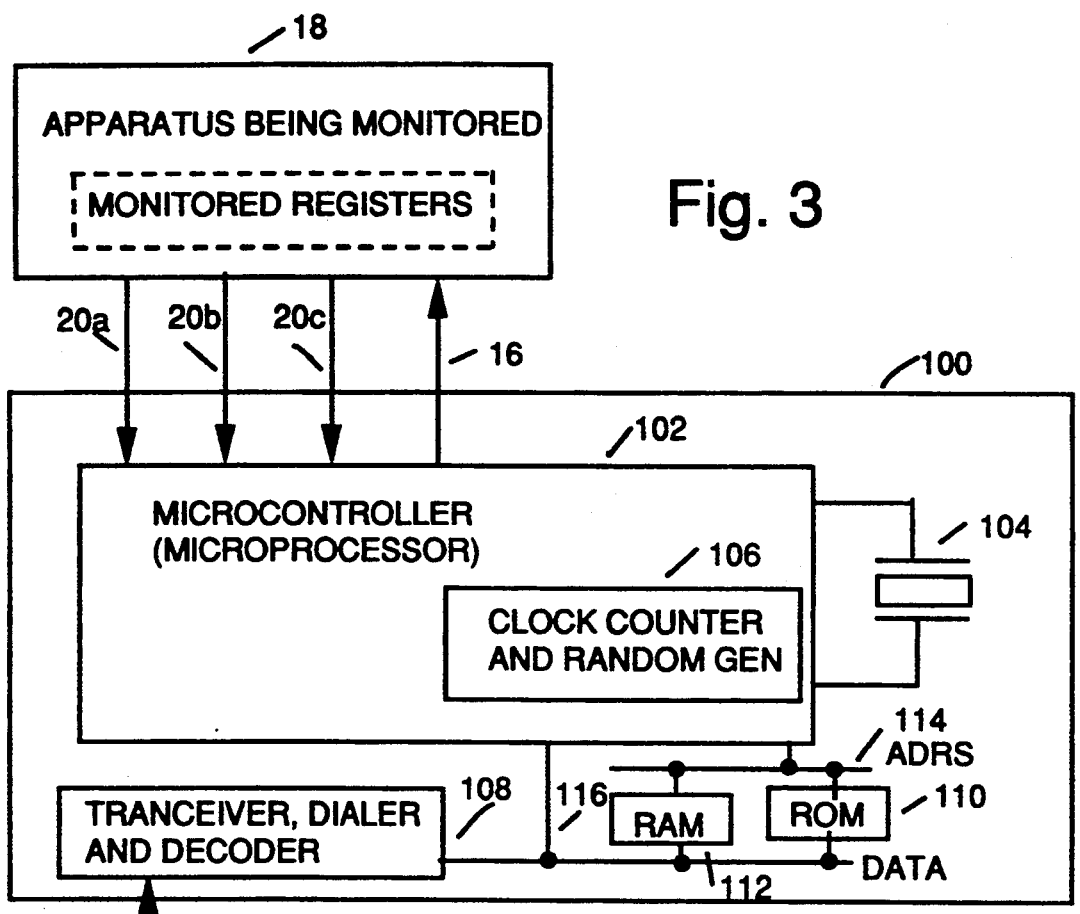
FIG. 3 is a functional block diagram of the remote site electronics of the present invention.

FIG. 3. is a hardware implementation of the present invention shown as a block diagram with the functions implemented in device 100. Device 100 includes a microprocessor 102, a crystal oscillator 104, ROM 110 and RAM 112 in communication with microprocessor 102. The clock signal from oscillator 104 is counted in a counter 106 internal to microprocessor 102. An example of such a microprocessor is Motorola 68 HC11. Microprocessor 102 also performs random number processing steps 62 through 74 as described in FIG. 2. Another portion of device 100 is a transceiver, dialer, encoder/decoder 108 which in cooperation with microprocessor 102, generates the outgoing signal 34. Transceiver 108 can include a modem, FAX machine or DTMF encoder/decoder, depending on the method of communication selected for inclusion in apparatus 18 before shipment. This selection will be dependent of the usual type of interface to the telephone, or other communications line, that apparatus 18 is typically used with.

The decode feature included here permits the central site to transmit a new telephone number for apparatus 18 to use in calling "home" to either avoid detection, or when it is necessary for the central site to change its telephone number.

The monitored apparatus 18 is shown having four leads in communication with microprocessor 102. One lead is for the test probe signal 16 for initiating the monitoring process. In addition there are three separate signals 20a, 20b and 20c which correspond to signal 20 in FIG. 1. These signals are emergency interrupt 20a, partial address 20b and data bus 20c. The emergency interrupt signal occurs when the apparatus 18 being monitored indicates nonstandard performance. This sets off a telephone call of a class other than the random triggered time. The data from apparatus 18 is sent in the form of an address and a data signal, as is common in the microprocessor art.

Figure 4:
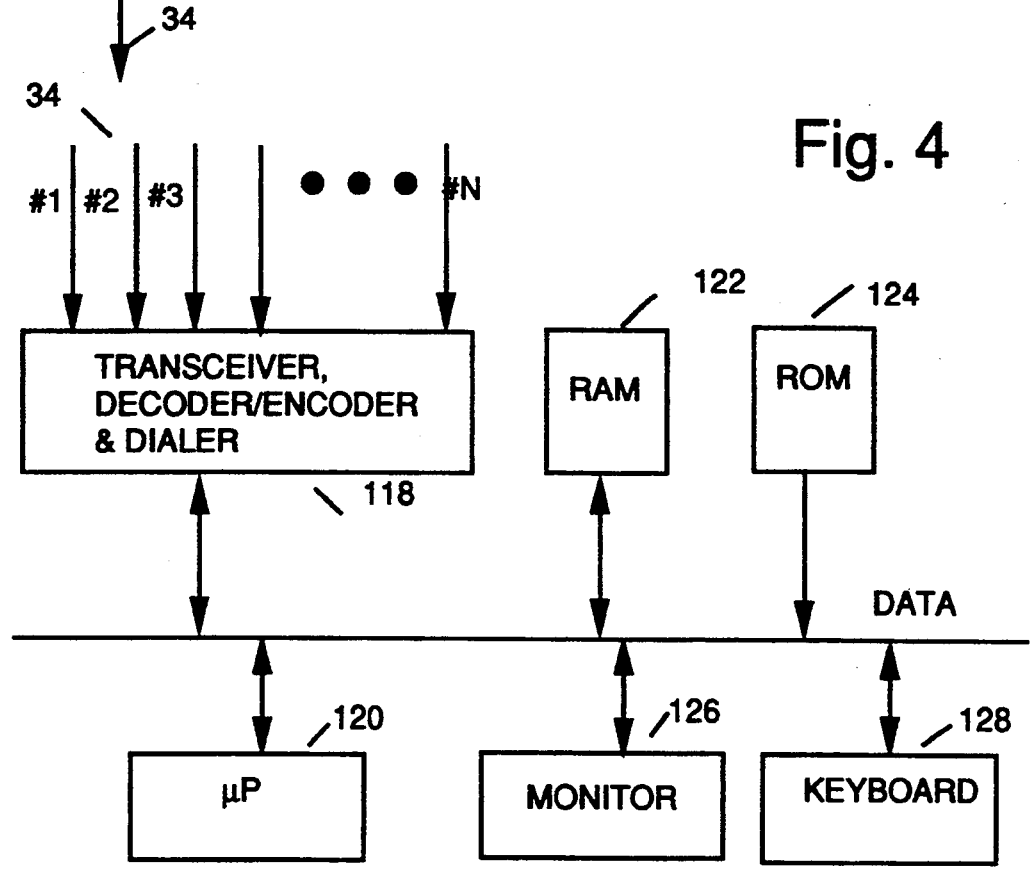
FIG. 4 is a functional block diagram of the central site electronics of the present invention.

Referring next to FIG. 4 there is shown a functional block diagram of the central site of the present invention. The blocks illustrated here perform the function of blocks 36–44 of FIG. 1. Included are a multi-port transceiver/encoder/decoder/dialer 118 for receiving the signal 34 from each of the remote sites, and for sending information to those sites. The information sent to the remote sites may include, for example, a new telephone number to be used to call the central site in the future. Unit 118 communicates with a central site microprocessor 120 via a data bus. Also in communication with microprocessor 120 via the data bus are RAM 122, ROM 124, monitor 126 and keyboard 128. ROM 124 is to provide instructions for the operation of the central site microprocessor 120, and RAM 122 is for storage of the data from each remote site, including the telephone number, or family of numbers that each monitored apparatus 18 used to call the central site, and for each serial number copy of the software that is to be protected. Monitor 126 and keyboard 128 are provided to allow the personnel at the central site to interact with the system for making modifications to it or for investigating potential or real problems with software use by the remote sites.

DESCRIPTION OF OPERATION

As seen from the above-discussion, the present invention can be implemented by means of a separate microprocessor based subsystem or implemented by means of software that operates on the internal processor of the apparatus 18 to be monitored. It is intended that the present invention could be used to monitor performance parameters such as disk space usage, total number of incoming and outgoing calls, and the number of calls per modem/FAX/DTMF board. At random intervals, the desired information is related to the Central Site via a toll-free telephone number.

The use of a toll-free telephone number provides two major benefits:
1) The apparatus user will never see the calls on his telephone bill, thus eliminating any objections that the user may have about cost.
2) ANI (presently available nationally in the U.S. only on 800 numbers) can be used to determine the calling apparatus telephone number and thus the installation address.

The software protection afforded by the present invention arises, in part, from the capability to determine the source of the call at the Central Site. By imbedding a unique serial number in the software shipped with each system, it becomes possible to track the current whereabouts of each copy of the software that has been shipped. There may be some variation in the ANI telephone numbers received at the Central Site, for monitored apparatus that are installed at Remote Sites that have several different telephone lines available for the device to use for outgoing telephone calls. However, over time, the Central Site will be able to determine the profile of which numbers are connected to which monitored apparatus by storing and comparing those numbers each time a remote site calls in.

With any protection device, there will always be attempts to try to work around it. Some of the features that can be included in the present invention to make this more difficult are:
1) Send monitoring transmissions back to the Central Site in the middle of other traffic to make it more difficult to "pull the plug" to prevent the system from calling home.
2) Schedule the transmissions to occur randomly—the monitored apparatus shouldn't phone home every Monday at 8 A.M.
3) Randomize the Central Site telephone number that is called. The monitored apparatus can be preprogrammed with more than one telephone number for the Central Site; if it can't get through on the first number, then it can try an alternate number. The fact that a call is received on the alternate number may be a clue that access to the first number has been somehow blocked. The Central Site can also be programmed to issue a new telephone number to the Remote Site monitored apparatus. This is desirable if it ever becomes necessary to change the 800 number (for example, when changing the interstate carrier).
4) Program the Remote Site monitored apparatus to place exactly one call per time period, i.e. day, week or month. Thus, if the Central Site observes multiple calls from the same software serial number in the same time period, then it can be certain that that copy of the software has been installed on more than one system in the field.
5) Randomize the board (or line) that the monitored apparatus uses of outgoing calls.

Figure 5:
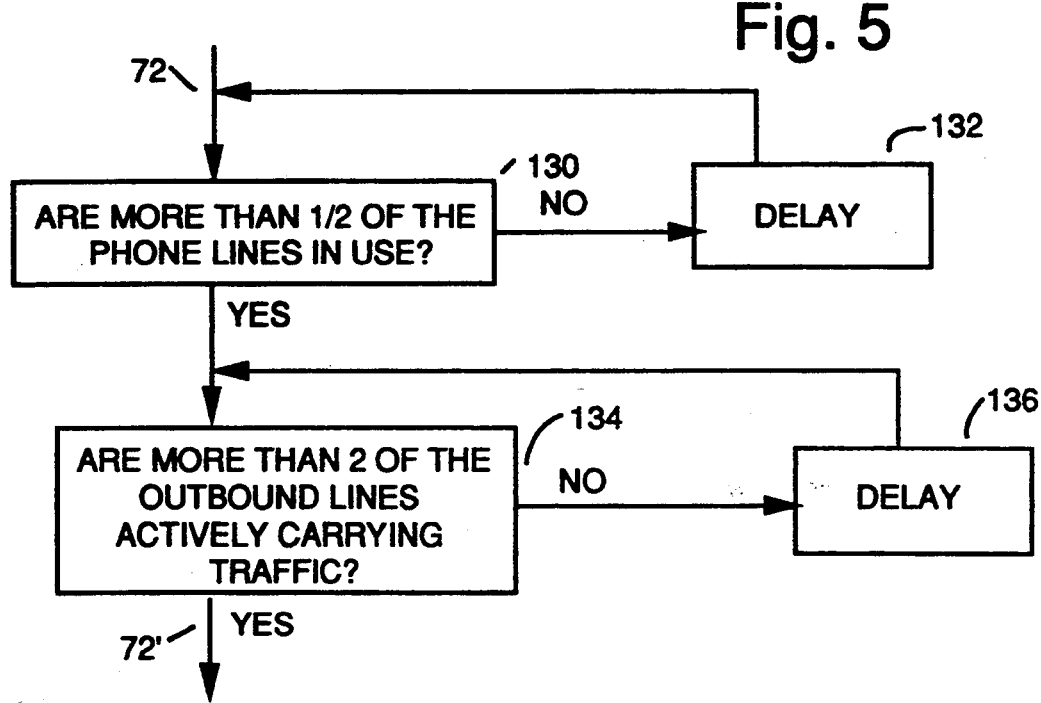
FIG. 5 is a first modification of the randomizer flow chart of FIG. 2.
Figure 6:
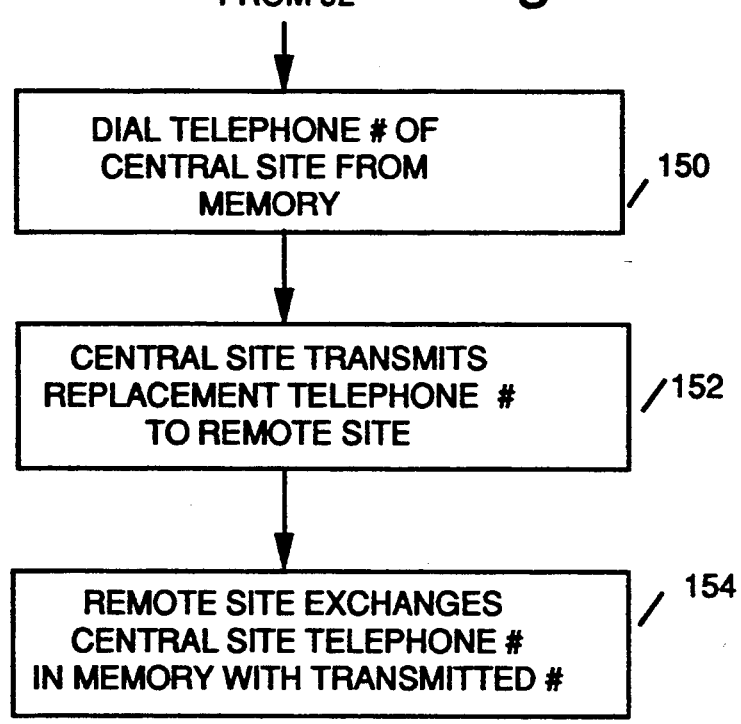
FIG. 6 is a second modification of the randomizer flow chart of FIG. 2.
Figure 7:
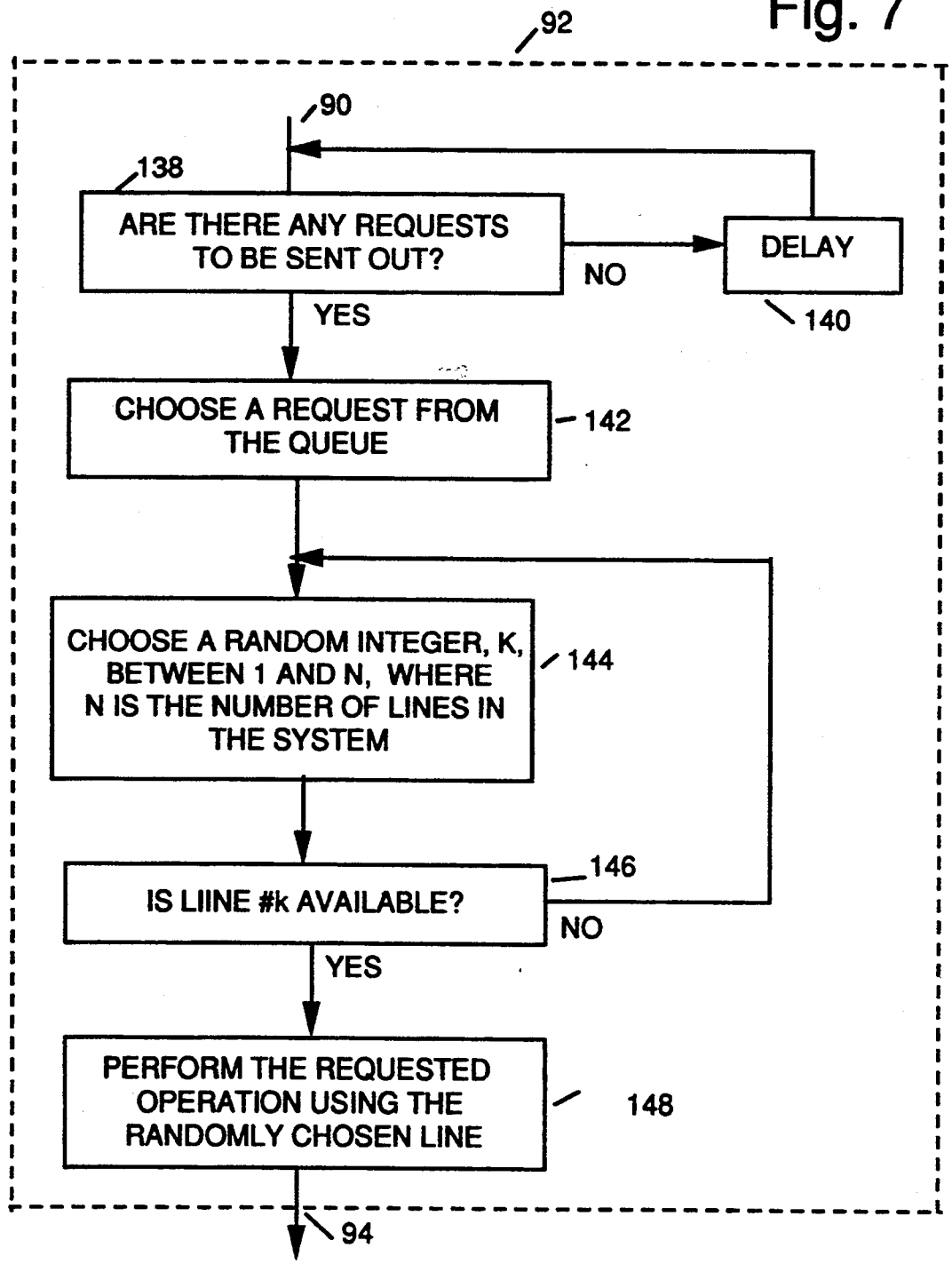
FIG. 7 is a third modification of the randomizer flow chart of FIG. 2.

Each of FIGS. 5–7 illustrate optional modifications to the randomizer flow chart of FIG. 2 to implement several of the other potentially useful features discussed above. These can be added individually, or in any combination to include as many or as few of the features in a particular installation.

FIG. 5 illustrates the modification to FIG. 2 to allow the remote site to slip the call to the central site into other traffic that apparatus 18 is engaging in. The flow chart of FIG. 5 is to be inserted between blocks 70 and 74 in FIG. 2, thus the incoming flow line of FIG. 5 is labelled 72, while its outgoing flow line is labelled 72'. To slip the outgoing call from apparatus 18 into other traffic, block 130 inquires if at least ½ of the telephone lines of apparatus 18 are in use, if no there is a delay (block 132) for a preselected period of time before block 130 is again visited. If more than ½ of the telephone lines are in use, then control goes to block 134 to determine if more than 2 of the telephone lines in use are occupied with outgoing traffic. If no, then delay 136 comes into play and control is returned to block 134. If more than 2 of the active telephone lines is active with outgoing traffic, then control proceeds to block 74 of FIG. 2.

FIG. 6 illustrates the updating of the telephone number of the central site in the remote site. The blocks of FIG. 6 are inserted into block 92 of FIG. 2 and provide an additional function for that block. As discussed above, as a part of block 92, the telephone number of the central site is dialed from memory (RAM 112 FIG. 3) (block 150). During the connect time with the central site, the central site at its option transmits a replacement telephone number to the remote site (block 152). The remote site then exchanges the new number for the central site for the old one that is stored in RAM 112 (block 154).

The routine of FIG. 7 will give the remote site monitoring system the ability to randomly pick an outgoing telephone line from those lines to which apparatus 18 has available. The flow chart shown here would also be included in the function of block 92 of FIG. 2. This function is performed by first determining if there are any requests to be sent out (block 138). If not control is delayed (block 140) a preselected period of time before control is returned to block 138. If yes a request is chosen form the queue (block 142). Next a random integer that corresponds to one of the outgoing lines to which the remote site is connected is chosen (block 144) which is followed by a test block 146 to determine if that telephone line is free. If it is not free, then control returns to block 144 to select another number. If the telephone line that corresponds to the selected number is free, then the requested operation, as discussed above, is performed using the chosen telephone line (block 148).

No approach can provide a 100% guarantee that a single copy of a software product is not installed on more than one system, however, the steps listed above, together with others, will make it relatively difficult to defeat the monitored apparatus' call-out attempts. This approach is not specific to fax, voice mail and E-mail systems. It could be used with any system normally using modems or even those connected to a local area network (LAN).

Further, from the foregoing description, it will be apparent that the invention disclosed herein provides a novel and advantageous software monitoring and protection system. As will be understood by those familiar with the art, the invention may be embodied in other specific forms without departing from the spirit or essential characteristics thereof. The scope of the present invention is limited only by the scope of the claims appended hereto.

What is claimed is:

1. A performance monitoring system, a portion of which is for inclusion in an electrical apparatus, to monitor performance features of that electrical apparatus during operation surreptitiously of a user of said electrical apparatus, said system comprising:
   remote site means for inclusion in each of said electrical apparatus to be monitored by the system, each remote site means including:
      monitor means programmed for collecting data on at least one performance feature of said electrical apparatus of interest to the system surreptitiously of a user of said electrical apparatus;
      formatting means for creating a message bearing packet containing data collected by said monitoring means; and
      transmission means for initiating, at a semi-random rate, the transmission of the message packet from the formatting means to a central site means of the system surreptitiously of a user of said electrical apparatus; and
   central site means for receiving information from at least one remote site means, said central site including:
      decoding means for receiving and processing the packet of said collected data on at least one performance feature of said electrical apparatus of interest to the system from at least one remote site means; and
      detection means for comparing the decoded collected data from each remote site means with the expected corresponding data for electrical apparatus of the type in which said remote site means is installed to identify the location of each of said remote sites means.

2. A performance monitoring system as in claim 1 wherein:
   said remote site means further includes:
      unique identification means for providing each remote site means with a unique machine determinable identification; and
   said formatting means also includes said unique identification in said message bearing packet.

3. A performance monitoring system as in claim 1 wherein said transmission between said remote site means and said central site means is telephone transmission.

4. A performance monitoring system as in claim 3 wherein said remote site means further includes number selection means for selecting randomly from a list of at least two telephone numbers at said central site means to which to transmit said status information.

5. A performance monitoring system as in claim 1 wherein:
   said semi-random rate of said transmission means of each of said remote site means has a selected range of values; and
   said detection means of said central site means includes fraudulent usage detection for detecting the receipt of status information including the same unique identification from different remote site means during the same selected range of values of the semi-random transmission rate.

6. A performance monitoring system as in claim 3 wherein said central site means further includes automatic number identification means for identifying the telephone number from which each remote site means places it's call.

7. A performance monitoring system as in claim 3 wherein said transmission means of said remote site means places the call to said central site means using a toll-free telephone number which is assigned to said central site means.

8. A performance monitoring system as in claim 1 wherein said transmission means of said remote site means transmits said message packet to said central site means amid other messages that are being transmitted to other locations.

9. A performance monitoring system as in claim 3 wherein said remote site means further includes number selection means for selecting from at least two outgoing telephone lines that have been assigned to said remote site means on which to call said central site means.

10. A performance monitoring system as in claim 3 wherein:
said central site means further includes means for transmitting different telephone numbers to said each remote site means for updating the telephone number list used to make future calls to said central site means; and
said remote site means includes means for receiving and storing said different telephone numbers of said central site means for making future telephone calls to said central site means.

11. A method for monitoring software usage of owner-leased proprietary software residing in at least one remote computer surreptitiously of a user of said remote computer to detect violations of software usage agreements surreptitiously of a user of said remote computer at a central site means, said method comprising the steps of:
a. imbedding unique usage agreement information that is transparent to the user in each original copy of said owner-leased proprietary software;
b. each of said at least one remote computers monitoring the use of said software of step a. surreptitiously of a user of said remote computer;
c. each of said at least one remote computers automatically, at various times, reporting said terms of said usage agreement imbedded in said software and the use of said software by said remote computer monitored in step b. to said central site means surreptitiously of a user of said remote computer;
d. said central site means receiving the report of step c. from at least one remote computer;
e. said central site means interpreting the received reports of step d. from each of said at least one remote computers to determine when each usage agreement is violated; and
f. said central site means transmitting software operation modification information to each of said at least one remote computers at which an agreement violation was detected in step e. surreptitiously of a user of said remote computer to modify said owner-leased proprietary software residing in the appropriate remote computers.

12. A remote site performance monitoring system for inclusion in an electrical apparatus to monitor and collect performance data thereof during operation surreptitiously of a user of said electrical apparatus for transmitting said collected performance data to a central site means for comparing the received collected performance data with expected performance data for electrical apparatus of the type in which said remote site performance monitoring system has been added, said remote site system comprising:
monitor means programmed for collecting data on at least one performance feature of said electrical apparatus of interest to the system surreptitiously of a user of said electrical apparatus;
formatting means for creating a message bearing packet containing data collected by said monitoring means; and
transmission means for initiating, at a semi-random rate, the transmission of the message packet from the formatting means to the central site means of the system surreptitiously of a user of said electrical apparatus.

13. A remote site performance monitoring system as in claim 12:
further including unique identification means for providing said remote site system with a unique machine determinable identification; and
said formatting means also includes said unique identification in said message bearing packet.

14. A remote site performance monitoring system as in claim 13 wherein said transmission between said remote site system and said central site is telephone transmission.

15. A remote site performance monitoring system as in claim 14 further includes number selection means for selecting randomly from a list of at least two telephone numbers at said central site means to which to transmit said monitored performance data.

16. A remote site performance monitoring system as in claim 14 wherein said transmission means places the call to said central site means using a toll-free telephone number which is assigned to said central site means.

17. A remote site performance monitoring system as in claim 12 wherein said transmission means transmits said message packet to said central site means amid other messages that are being transmitted to other locations.

18. A remote site performance monitoring system as in claim 14 further includes number selection means for selecting from at least two outgoing telephone lines that have been assigned to said remote site system on which to call said central site means.

19. A remote site performance monitoring system as in claim 14 wherein said remote site means includes means for receiving and storing different telephone numbers received of said central site means for making future calls to said central site means.

20. A central site performance monitoring system for receiving performance data from at least one remote site means included in an electrical apparatus, said data being collected by said remote site means surreptitiously of a user of said electrical apparatus to report said collected performance data of that electrical apparatus during operation surreptitiously of a user of said electrical apparatus to said central site performance monitoring system, said central site system comprising:
decoding means for receiving and processing said collected performance data from each remote site means; and
detection means for comparing the received collected data from each remote site means with expected data for electrical apparatus of the type in which said remote site means has been added to identify the location of each of said remote site means.

21. A central site performance monitoring system as in claim 20 wherein the remote site means initiates transmission to said central site system at a semi-random rate and has a semi-random rate within a selected range of values with the status information being accompanied by a unique machine determinable identification, said detection means of said central site system further includes fraudulent usage detection for detecting the receipt of status information including the same unique identification from different remote site means during the same selected range of values of the semi-random transmission rate.

22. A central site performance monitoring system as in claim 21 wherein said transmission between said remote site means and said central site means is telephone transmission.

23. A central site performance monitoring system as in claim 22 further includes means for transmitting different telephone numbers to said each remote site means for updating the telephone number list used to make future calls to said central site means.

24. A central site performance monitoring system as in claim 22 further including automatic number identification means for identifying the telephone number from which each remote site means places it's call.

25. A method of monitoring the performance of at least one electrical apparatus surreptitiously of a user of said electrical apparatus at a remote site that includes remote site monitoring means that collects surreptitiously of a user of said electrical apparatus and reports performance data from said electrical apparatus surreptitiously of a user of said electrical apparatus to a central site monitoring means, said method comprising the steps of:
- a. collecting data by said remote monitoring means on at least one performance feature of said electrical apparatus of interest;
- b. formatting by said remote site monitoring means of a message bearing packet containing data collected in step a., said message bearing packet including unique identification information that was assigned to said electrical apparatus prior to shipping of said apparatus to said remote site;
- c. said remote site monitoring means initiating transmission, at a semi-random rate, of said message packet of step b. to the central site monitoring means;
- d. receiving the message packet of step c. at the central site monitoring means from each remote site monitoring means;
- e. decoding the received massage packet of step d. at said central site monitoring means; and
- f. comparing the performance data from step e. with the expected performance data at the central site monitoring means for each of the electrical apparatus of the type in which said remote site monitoring means is installed to identify the location of at least one remote monitoring means.

26. A method as in claim 25, said step b. is performed by placing a telephone call to said central monitoring means using a toll free telephone number.

27. A method as in claim 25 wherein:
said method further includes the step of:
- g. identifying if more than one remote monitoring means transmits the same unique identification to the central monitoring means within the same selected time period as another.

28. A method as in claim 27 further including the steps of:
- h. determining the location of at least one remote monitoring means reporting the same unique identification using the results of step g.; and
- i. determining if at least one of the electrical apparatus at the locations determined in step h. is using an illegal copy of a properly uniquely identified electrical apparatus.

29. A system to monitor software usage of owner-leased proprietary software residing in at least one remote computer surreptitiously of a user of said electrical apparatus to detect violations of software usage agreements surreptitiously of a user of said electrical apparatus at a central site means, said system comprising:
each original copy of said owner-leased proprietary software including unique usage agreement information that is transparent to the user of said software;
each of said at least one remote computer includes:
- monitoring means for monitoring the use of said software surreptitiously of a user of said electrical apparatus; and
- transmitting means for automatically, at various times, reporting said terms of said usage agreement and the use of said software by said remote computer detected by said monitoring means to said central site means surreptitiously of a user of said remote computer; and central site means for receiving said agreement information and said monitored usage information from at least one remote computer, said central site means including:
- transmission receiving means for receiving transmissions from at least one remote computer; and
- interpretation means for interpreting the received information from each of said at least one remote computers to determine when each usage agreement is violated.

30. A system as in claim 29 wherein:
said monitoring means of at least one remote computer also monitors general performance characteristics of said remote computer and said transmission means transmits that information to said central site means; and
said interpretation means of said central site means determines the general performance of each of said remote computers from said general performance information received.

31. A system as in claim 30 wherein said general performance information is transmitted from said remote computer to said central site means interspersed with said usage agreement information.

32. A system as in claim 29:
wherein said central site means further includes:
- means for generating software performance modification instructions to each of said at least one remote computers where agreement violations have been detected surreptitiously of a user of said remote computer; and
- transmission means for transmitting said software performance modification instructions to each of said at least one remote computers where agreement violations have been detected surreptitiously of a user of said remote computer; and
wherein said each original copy of said owner-leased proprietary software includes means for receiving said software performance modification instructions from said central site means to modify subsequent operation of said software.

33. A system as in claim 29 wherein said central site means further includes means for identifying the telecommunications path by which each of said at least one remote computers reports to said central site means through the use of telephone system automatic number identification to identify the telephone number each remote computer used for transmission of violation reports.

34. A system as in claim 29 wherein said central site means further includes means for determining the source address of each of said at least one remote computers that transmits a violation report to said central site means from packet headers when a packet communications system is used as the telecommunications network between said remote computers and said central site means, 35. A system as in claim 29:
   wherein each original copy of said owner-leased proprietary software includes unique copy identification information that is transparent to the user of said software;
   wherein said monitoring means of each of said at least one remote computers includes in said report that is transmitted said unique copy identification information of the copy of said software that is running on said remote computer; and
   wherein said interpretation means of said central site means tracks the unique copy identification information received in each transmission from each of said remote computers to detect if more than one remote computer is using the same copy of said software.

36. A system as in claim 29 wherein said transmission means of said remote computer includes pseudo-random delay means to randomly vary the times that each report is transmitted to said central site means.

37. A system as in claim 29 wherein:
   said transmission means of said remote computer includes means for use of multiple telephone numbers to reach said central site means; and
   said interpretation means of said central site means includes means for determining which telephone numbers are associated with each of said at least one remote computers.

38. A system as in claim 29 wherein said transmission means transmits said user agreement information to said central site means amid other messages that are being transmitted to other locations.

* * * * *